United States Patent
Kim et al.

(10) Patent No.: US 11,470,298 B2
(45) Date of Patent: Oct. 11, 2022

(54) METHOD AND APPARATUS WITH UPDATING OF ALGORITHM FOR GENERATING DISPARITY IMAGE

(71) Applicant: Samsung Electronics Co., Ltd., Suwon-si (KR)

(72) Inventors: Seungeon Kim, Incheon-si (KR); Wonhee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 16/837,320

(22) Filed: Apr. 1, 2020

(65) Prior Publication Data
US 2021/0144355 A1 May 13, 2021

(30) Foreign Application Priority Data
Nov. 11, 2019 (KR) .................. 10-2019-0143128

(51) Int. Cl.
| | |
|---|---|
| H04N 13/128 | (2018.01) |
| G06N 3/08 | (2006.01) |
| H04N 13/239 | (2018.01) |
| H04N 13/00 | (2018.01) |

(52) U.S. Cl.
CPC .......... *H04N 13/128* (2018.05); *G06N 3/084* (2013.01); *H04N 13/239* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 10,353,271 B2 | 7/2019 | Wang et al. | |
| 10,380,753 B1 * | 8/2019 | Csordás et al. | G06V 10/751 |

(Continued)

FOREIGN PATENT DOCUMENTS

| | | |
|---|---|---|
| KR | 10-1245214 B1 | 3/2013 |
| KR | 10-1797035 B1 | 11/2017 |

(Continued)

OTHER PUBLICATIONS

Mehta, Ishit, Parikshit Sakurikar, and P. J. Narayanan. "Structured adversarial training for unsupervised monocular depth estimation." 2018 International Conference on 3D Vision (3DV). IEEE, 2018. (Year: 2018).*

(Continued)

*Primary Examiner* — Michelle M Entezari
*Assistant Examiner* — Michelle M Entezari Hausmann
(74) *Attorney, Agent, or Firm* — NSIP Law

(57) ABSTRACT

A method with algorithm updating includes: receiving a first input batch including one or more first images; generating a first output batch with respect to the first input batch using an algorithm configured to generate a disparity image, the first output batch including one or more first output images; receiving a second input batch corresponding to the first input batch, the second input batch including one or more second images having viewpoints that are different from viewpoints of the one or more first images; generating a test batch based on the first output batch and the second input batch, the test batch including one or more test images; and updating the algorithm based on a difference between the first input batch and the test batch.

25 Claims, 14 Drawing Sheets

(56) References Cited

U.S. PATENT DOCUMENTS

| | | | | |
|---|---|---|---|---|
| 2012/0127271 | A1* | 5/2012 | Song | H04N 13/296 |
| | | | | 348/46 |
| 2012/0140038 | A1* | 6/2012 | Bi | H04N 13/128 |
| | | | | 348/46 |
| 2014/0063188 | A1* | 3/2014 | Smirnov | G06T 7/593 |
| | | | | 348/43 |
| 2016/0150210 | A1* | 5/2016 | Chang | G06T 7/593 |
| | | | | 382/154 |
| 2017/0085863 | A1* | 3/2017 | Lopez | H04N 13/261 |
| 2018/0061068 | A1 | 3/2018 | Jiao et al. | |
| 2018/0075614 | A1 | 3/2018 | He | |
| 2019/0028698 | A1* | 1/2019 | Lin | H04N 13/354 |
| 2019/0108396 | A1* | 4/2019 | Dal Mutto | G07G 1/0063 |
| 2019/0301861 | A1* | 10/2019 | Wang | G01C 3/14 |
| 2020/0228774 | A1* | 7/2020 | Kar | G06T 7/579 |

FOREIGN PATENT DOCUMENTS

| | | |
|---|---|---|
| KR | 10-2018-0087994 A | 8/2018 |
| KR | 10-1905528 B1 | 10/2018 |

OTHER PUBLICATIONS

Wang, Longguang, et al. "Learning parallax attention for stereo image super-resolution." Proceedings of the IEEE/CVF Conference on Computer Vision and Pattern Recognition. 2019. (Year: 2019).*

Greene, W. Nicholas, and Nicholas Roy. "MultiViewStereoNet: Fast Multi-View Stereo Depth Estimation using Incremental Viewpoint-Compensated Feature Extraction." 2021 IEEE International Conference on Robotics and Automation (ICRA). IEEE, 2021. (Year: 2021).*

Zhu, Shengjie, Garrick Brazil, and Xiaoming Liu. "The edge of depth: Explicit constraints between segmentation and depth." Proceedings of the IEEE/CVF Conference on Computer Vision and Pattern Recognition. 2020. (Year: 2020).*

Watson, Jamie, Michael Firman, Gabriel J. Brostow, and Daniyar Turmukhambetov. "Self-supervised monocular depth hints." In Proceedings of the IEEE/CVF International Conference on Computer Vision, pp. 2162-2171. 2019. (Year: 2019).*

Xie, Junyuan et al., "Deep3D: Fully Automatic 2D-to-3D Video Conversion with Deep Convolutional Neural Networks", *ECCV: European Conference on Computer Vision*, 2016 (pp. 1-15).

Godard, Clement et al., "Unsupervised Monocular Depth Estimation with Left-Right Consistency", *The IEEE Conference on Computer Vision and Pattern Recognition (CVPR)*, 2017 (pp. 270-279).

Zhan, Huangying et al., "Unsupervised Learning of Monocular Depth Estimation and Visual Odometry with Deep Feature Reconstruction", *The IEEE Conference on Computer Vision and Pattern Recognition (CVPR)*, 2018 (pp. 340-349).

Chen, Po-Yi et al., "Towards Scene Understanding: Unsupervised Monocular Depth Estimation with Semantic-aware Representation", *The IEEE Conference on Computer Vision and Pattern Recognition (CVPR)*, 2019 (pp. 2624-2632).

* cited by examiner

METHOD AND APPARATUS WITH UPDATING OF ALGORITHM FOR GENERATING DISPARITY IMAGE

CROSS-REFERENCE TO RELATED APPLICATIONS

This application claims the benefit under 35 USC § 119(a) of Korean Patent Application No. 10-2019-0143128 filed on Nov. 11, 2019 in the Korean Intellectual Property Office, the entire disclosure of which is incorporated herein by reference for all purposes.

BACKGROUND

1. Field

The following description relates to technology for updating an algorithm, for example, technology for updating an algorithm for generating a disparity image.

2. Description of Related Art

With the development of technologies for processing captured images of a scene, methods for modifying the captured images are being developed. For example, a virtual image is generated by changing a viewpoint of an image. To accurately generate a virtual image, a depth from the viewpoint at which the image is captured to an object of a scene needs to be measured accurately. For example, the depth is determined by measuring a time of flight (TOF) using a laser. In another example, the depth is determined by calculating a binocular disparity with respect to matched stereo images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method with algorithm updating includes: receiving a first input batch including one or more first images; generating a first output batch with respect to the first input batch using an algorithm configured to generate a disparity image, the first output batch including one or more first output images; receiving a second input batch corresponding to the first input batch, the second input batch including one or more second images having viewpoints that are different from viewpoints of the one or more first images; generating a test batch based on the first output batch and the second input batch, the test batch including one or more test images; and updating the algorithm based on a difference between the first input batch and the test batch.

The one or more first images may include at least one left image captured by a left camera of stereo cameras and at least one right image captured by a right camera of the stereo cameras.

The one or more first images may not have a label indicating a viewpoint.

The one or more first images and the one or more second images may be stereo images.

The algorithm may be a neural network-based algorithm.

The updating of the algorithm may include: determining the difference between the first input batch and the test batch; and updating the algorithm to reduce the difference between the first input batch and the test batch.

The determining of the difference between the first input batch and the test batch may include: generating respective masks on a first image, among the one or more first images, and a test image, among the one or more test images; and determining the difference between the first input batch and the test batch based on regions, excluding the masks, of the first image and the test image.

The generating of the respective masks may include generating the respective masks based on a baseline of a camera.

The generating of the respective masks may include generating the respective masks based on either one or both of object information in the first image and object information in the test image.

In another general aspect, a non-transitory computer-readable storage medium stores instructions that, when executed by a processor, cause the processor to perform the method described above.

In another general aspect, a method with algorithm updating includes: receiving a first input batch including one or more first images; generating a first output batch with respect to the first input batch using an algorithm for generating a disparity image, the first output batch including one or more first output images; generating a test batch based on the first output batch and the first input batch, the test batch including one or more test images; receiving a second input batch corresponding to the first input batch, the second input batch including one or more second images having viewpoints that are different from viewpoints of the one or more first images; and updating the algorithm based on a difference between the second input batch and the test batch.

The updating of the algorithm may include: determining the difference between the second input batch and the test batch; and updating the algorithm to reduce the difference between the second input batch and the test batch.

The determining of the difference between the second input batch and the test batch may include: generating respective masks on a second image, among the one or more second images, and a test image, among the one or more test images; and determining the difference between the second input batch and the test batch based on regions, excluding the masks, of the second image and the test image.

In another general aspect, a non-transitory computer-readable storage medium stores instructions that, when executed by a processor, cause the processor to perform the method described above.

In another general aspect, an apparatus with algorithm updating includes a processor configured to: receive a first input batch including one or more first images; generate a first output batch with respect to the first input batch using an algorithm configured to generate a disparity image, the first output batch including one or more first output images; receive a second input batch corresponding to the first input batch, the second input batch including one or more second images having viewpoints that are different from viewpoints of the one or more first images; generate a test batch based on the first output batch and the second input batch, the test batch including one or more test images; and update the algorithm based on a difference between the first input batch and the test batch.

The one or more first images may include at least one left image captured by a left camera of stereo cameras and at least one right image captured by a right camera of the stereo cameras.

The updating of the algorithm may include: determining the difference between the first input batch and the test batch; and updating the algorithm to reduce the difference between the first input batch and the test batch.

The determining of the difference between the first input batch and the test batch may include: generating respective masks on a first image, among the one or more first images, and a test image, among the one or more test images; and determining the difference based on regions, excluding the masks, of the first image and the test image.

The generating of the respective masks may include generating the respective masks based on a baseline of a camera.

The generating of the respective masks may include generating the respective masks based on either one or both of object information in the first image and object information in the test image.

The apparatus may further include a memory storing a program, wherein the processor is configured to execute the program to receive the first input batch, generate the first output batch, receive the second input batch, generate the test batch, and update the algorithm.

In another general aspect, am apparatus with algorithm updating includes a processor configured to: receive a first input batch including one or more first images; generate a first output batch with respect to the first input batch using an algorithm for generating a disparity image, the first output batch including one or more first output images; generate a test batch based on the first output batch and the first input batch, the test batch including one or more test images; receive a second input batch corresponding to the first input batch, the second input batch including one or more second images having viewpoints that are different from viewpoints of the one or more first images; and update the algorithm based on a difference between the second input batch and the test batch.

The apparatus may further include stereo cameras including a left camera and a right camera, wherein the one or more first images include at least one left image generated by the left camera and at least one right image generated by the right camera.

The algorithm may include a neural network-based algorithm. The updating of the algorithm may include updating the algorithm through backpropagation.

The updating of the algorithm based on the difference between the second input batch and the test batch may include updating the algorithm based on an average of respective differences between second images, among the one or more second images, and corresponding test images, among the two or more test images.

Other features and aspects will be apparent from the following detailed description, the drawings, and the claims.

Figure 1:
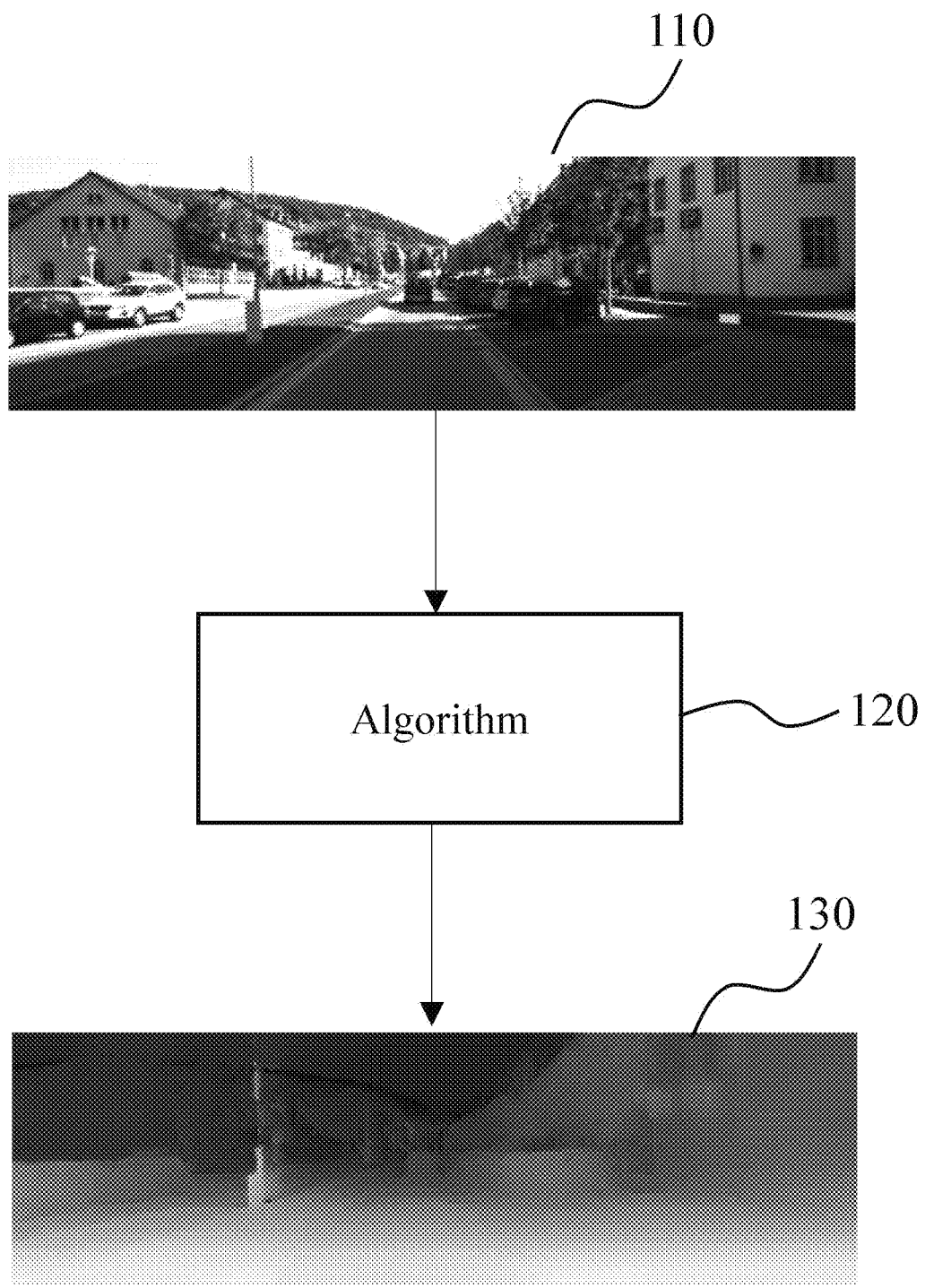
FIG. 1 illustrates an example of a disparity image generated based on a single image.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which examples belong, based on an understanding of the disclosure of this application. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

When describing the examples with reference to the accompanying drawings, like reference numerals refer to like constituent elements and a repeated description related thereto will be omitted. In the description of examples, detailed description of well-known related structures or functions will be omitted in the interest of conciseness.

FIG. 1 illustrates an example of a disparity image generated based on a single image.

A depth camera may be used to directly generate a depth image or a disparity image of a scene. Many current electronic devices include cameras for generating color images. A disparity image may be indirectly generated using color images generated using the camera. For example, a disparity image may be generated by calculating a binocular disparity between stereo images generated using stereo cameras. In another example, a disparity image may be generated based on an image generated by a monocular camera and an algorithm. The algorithm is, for example, a trained neural network.

An error may occur in a disparity image 130 generated based on a single image 110 and an algorithm 120. For example, if an algorithm 120 is not trained well, an error occurs in the generated disparity image 130. Hereinafter, a method of updating or training an algorithm for generating a disparity image will be described in detail with reference to FIGS. 2 through 14.

Figure 2:
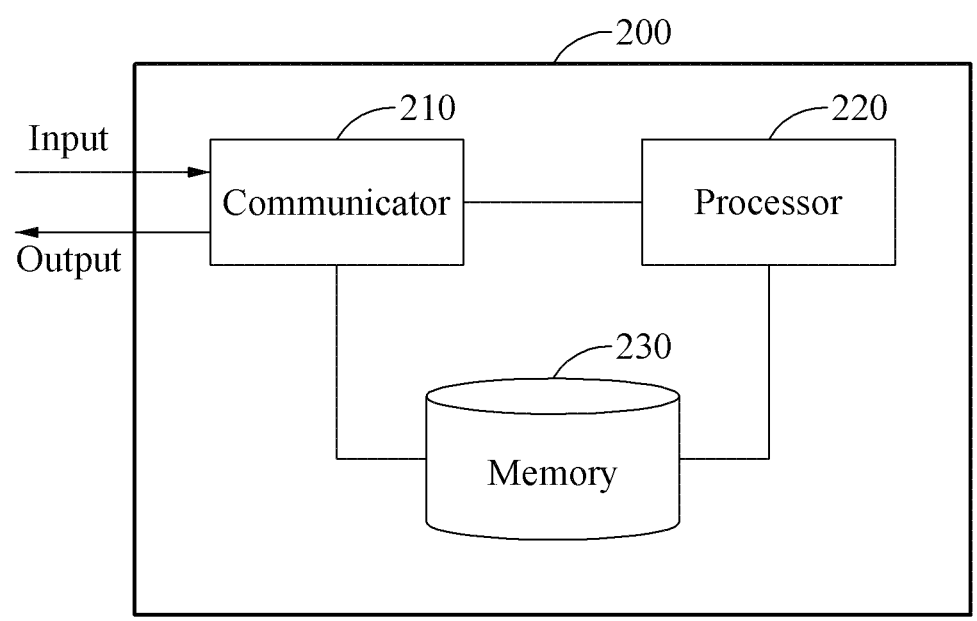
FIG. 2 illustrates an example of an algorithm updating apparatus.

FIG. 2 illustrates an example of an algorithm updating apparatus.

Referring to FIG. 2, an apparatus 200 for updating an algorithm includes, for example, a communicator 210, a processor 220, and a memory 230. For example, the apparatus 200 is an apparatus for updating or training the algorithm 120 of FIG. 1. Hereinafter, the term "update" and the term "train" may be interchangeably used.

The apparatus 200 may be a server with an excellent computing performance. In another example, the apparatus 200 may be an apparatus included in an electronic device. For example, the electronic device may be a device included in a vehicle.

The communicator 210 is connected to the processor 220 and the memory 230, and transmits and receives data to and from the processor 220 and the memory 230. The communicator 210 may be connected to an external device, and may transmit and receive data to and from the external device. Hereinafter, transmitting and receiving "A" refers to transmitting and receiving "information or data indicating A".

The communicator 210 is, for example, implemented as circuitry in the apparatus 200. For example, the communicator 210 includes an internal bus and an external bus. The communicator 210 is an element connecting the apparatus 200 and an external device. Therefore, the communicator 210 is an interface. The communicator 210 may receive data from the external device and may transmit the data to the processor 220 and the memory 230.

The processor 220 processes the data received by the communicator 210 and data stored in the memory 230. The "processor" is a data processing device implemented by hardware including a circuit having a physical structure to perform desired operations. For example, the desired operations include instructions or codes included in a program. For example, the hardware-implemented data processing device includes a microprocessor, a central processing unit (CPU), a processor core, a multi-core processor, a multiprocessor, an application-specific integrated circuit (ASIC), and a field-programmable gate array (FPGA).

The processor 220 executes computer-readable codes (for example, software) stored in a memory (for example, the memory 230) and instructions triggered by the processor 220.

The memory 230 stores the data received by the communicator 210 and the data processed by the processor 220. For example, the memory 230 stores the program (or an application, or software). The stored program is a syntax set coded to update the algorithm and executable by the processor 220.

The memory 230 includes at least one among a volatile memory, a non-volatile memory, a random-access memory (RAM), a flash memory, a hard disk drive, and an optical disk drive.

The memory 230 stores an instruction set (for example, software) for operating the apparatus 200. The instruction set for operating the apparatus 200 is executed by the processor 220.

The communicator 210, the processor 220, and the memory 230 will be described further below with reference to FIGS. 3 and 12.

Figure 3:
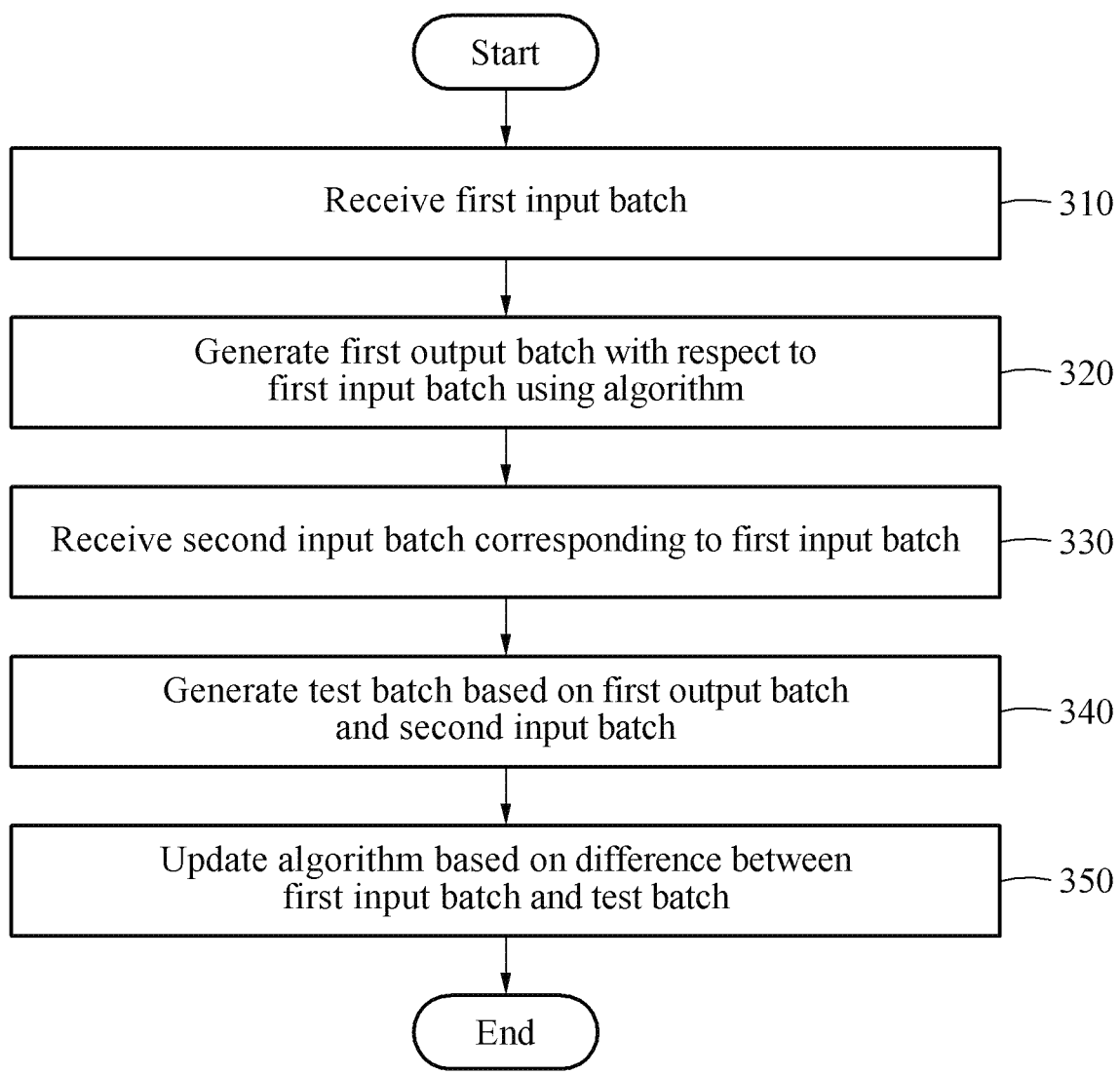
FIG. 3 illustrates an example of an algorithm updating method.

FIG. 3 illustrates an example of an algorithm updating method.

Operations 310 through 350 of FIG. 3 may be performed by the apparatus 200 of FIG. 2.

Referring to FIG. 3, in operation 310, the apparatus 200 receives a first input batch including one or more first images. For example, the apparatus 200 receives the first input batch from a database connected to the apparatus 200.

The first input batch may be generated by selecting two or more images among a plurality of images captured through one or more cameras. The one or more cameras may be stereo cameras, and thus, the plurality of images in the database may include left view images (hereinafter "left images") captured by a left camera and right view images (hereinafter "right images") captured by a right camera. For example, in a case in which the stereo cameras are provided in a vehicle, the plurality of images may be images of scenes changing as the vehicle moves.

The first input batch will be described in greater detail further below with reference to FIG. 4.

Still referring to FIG. 3, in operation 320, the apparatus 200 generates, using an algorithm, a first output batch with respect to the first input batch. The first output batch includes, for example, disparity images respectively corresponding to the first images of the first input batch.

The algorithm used to generate the first output batch is an algorithm to be updated, and generates the first output batch based on a current updating state. When the algorithm is updated better, a more accurate first output batch is generated. For example, the algorithm may be a neural network-based algorithm, for example, a deep neural network (DNN)-based algorithm.

The first images included in the first input batch may not have a label with respect to a viewpoint. That is, the algorithm for processing images may be unaware of information related to viewpoints of the input images. Thus, the algorithm may generate the first output batch irrespective of a verified specific viewpoint.

In operation 330, the apparatus 200 receives a second input batch corresponding to the first input batch. For example, the apparatus 200 receives the second input batch from the database connected to the apparatus 200. The second input batch includes second images corresponding to the first images of the first input batch. A viewpoint of one of the second images included in the second input batch may be different from a viewpoint of a corresponding one of the first images. For example, in a case in which an image in the first input batch is a left image, a corresponding image in the second input batch may be a right image. In an example in which an image in the first input batch is a right image, a corresponding image in the second input batch may be a left image.

The second input batch will be described further below with reference to FIG. 4.

In operation 340, the apparatus 200 generates a test batch based on the first output batch and the second input batch. The test batch includes one or more images.

Since an image of the first output batch is a disparity image, and an image of the second input batch is a color image, an image of a viewpoint different from a viewpoint of the image of the second input batch is generated based on the image of the first output batch and the image of the second input batch. The generated image of the test batch is an image of a viewpoint the same as that of the image of the first input batch.

Although FIG. 3 shows that operation 330 is performed and then operation 340 is subsequently performed, operations 330 and 340 may be performed independently and in parallel.

In operation 350, the apparatus 200 updates the algorithm based on a difference between the first input batch and the test batch. An image of the test batch is generated such that a viewpoint of the image of the test batch is the same as the viewpoint of the image of the first input batch. Since the viewpoint of the image of the test batch is the same as the viewpoint of the image of the first input batch, the image of the test batch and the image of the first input batch may be compared to each other. The image of the first input batch is regarded as a ground truth (GT), and a difference between the image of the first batch and the image of the test batch is determined. The algorithm used to generate the first output batch may be updated based on the difference between first batch and the test batch. An example of updating the algorithm will be described in detail with reference to FIGS. 7 through 11.

Although not shown, operations 310 to 350 may be repeated until a preset condition is satisfied. If operations 310 to 350 are performed again, the first input batch and the second input batch received from the database may be generated differently from those generated previously. For example, the preset condition may be that the difference between the test batch and the first input batch being less than a preset difference. For example, the preset condition may be that an average of respective differences between images of the test batch and corresponding images of the first input batch is less than the preset difference.

Figure 4:
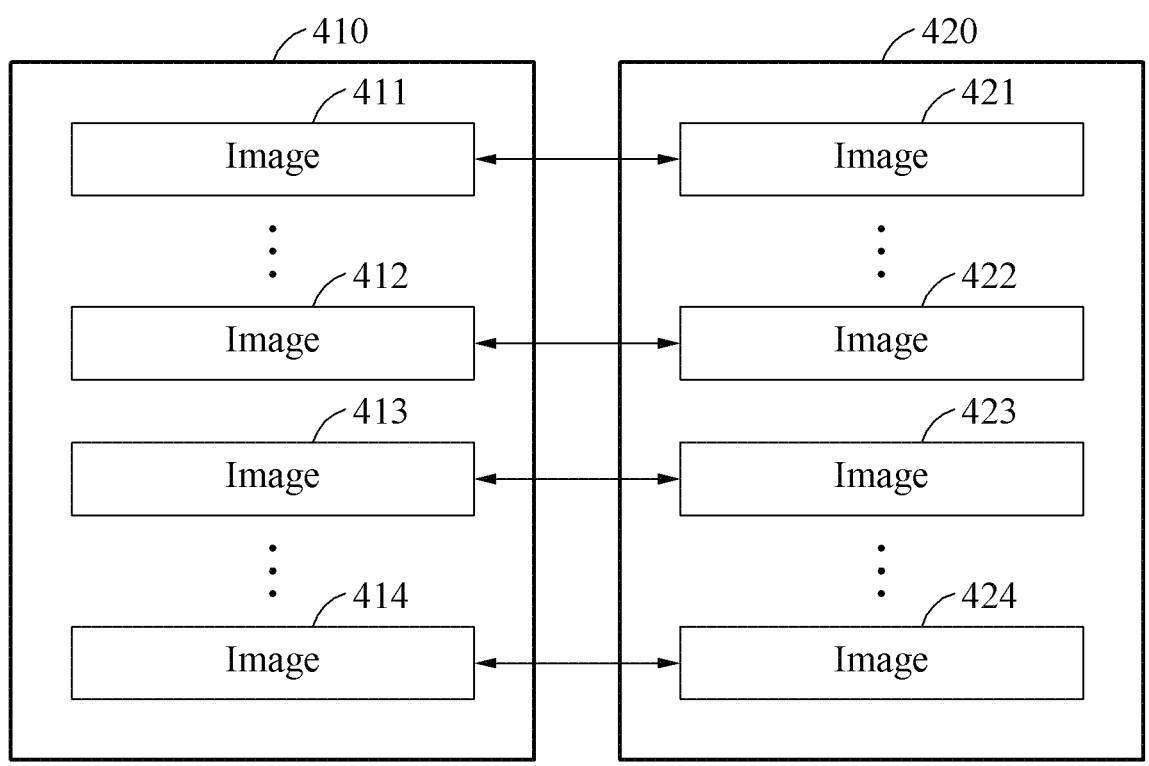
FIG. 4 illustrates an example of a first input batch and a second input batch.

FIG. 4 illustrates an example of a first input batch and a second input batch.

Referring to FIG. 4, a first input batch 410 includes images 411 to 414. For example, the images 411 to 412 are left images, and the images 413 to 414 are right images. The first input batch 410 may be generated such that a ratio of the left images to the right images is a preset ratio. For example, the ratio of the left images to the right images may be 1:1.

The images 413 to 414 included in the first input batch 410 may not have a label with respect to a viewpoint. That is, an algorithm for processing the images 413 to 414 may be unaware of information related to viewpoints of the images 413 to 414.

When the first input batch 410 is determined, a second input batch 420 is generated to correspond to the first input batch 410. The second input batch 420 includes images 421 to 424. The images 421 to 424 correspond to the images 411 to 414. The images 421 to 422 are right images, and the images 423 to 424 are left images. Thus, the images 411 to 414 and the images 421 to 424 are stereo images.

Figure 5:
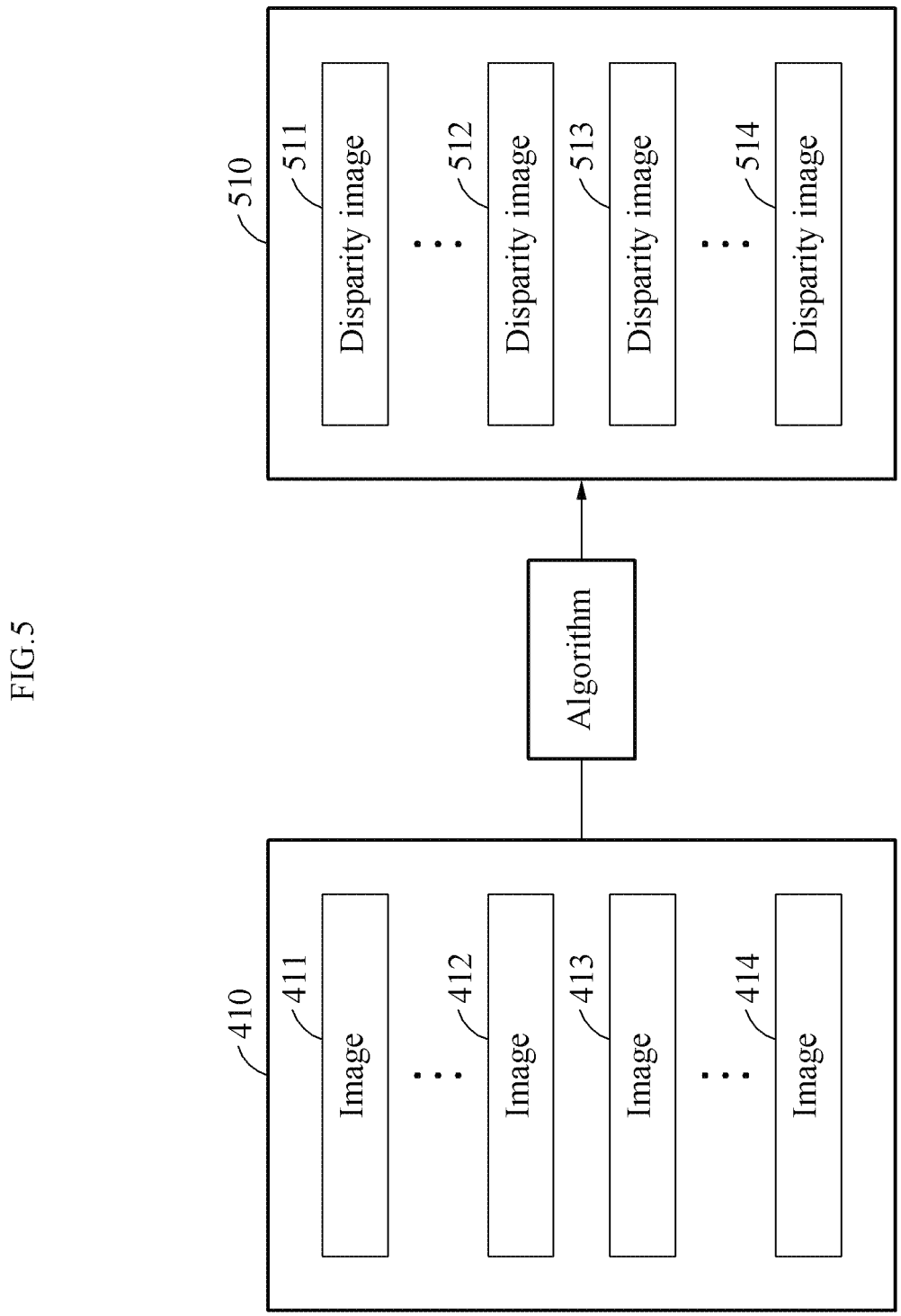
FIG. 5 illustrates an example of generating a first output batch based on a first input batch.

FIG. 5 illustrates an example of generating a first output batch based on a first input batch.

The apparatus 200 generates a first output batch 510 by inputting the first input batch 410 into the algorithm. The first output batch 510 includes disparity images 511 to 514, and the disparity images 511 to 514 respectively correspond to the images 411 to 414. For example, the disparity image 511 is a disparity image with respect to the image 411. As the algorithm is updated better, more accurate disparity images 511 to 514 are generated.

Figure 6:
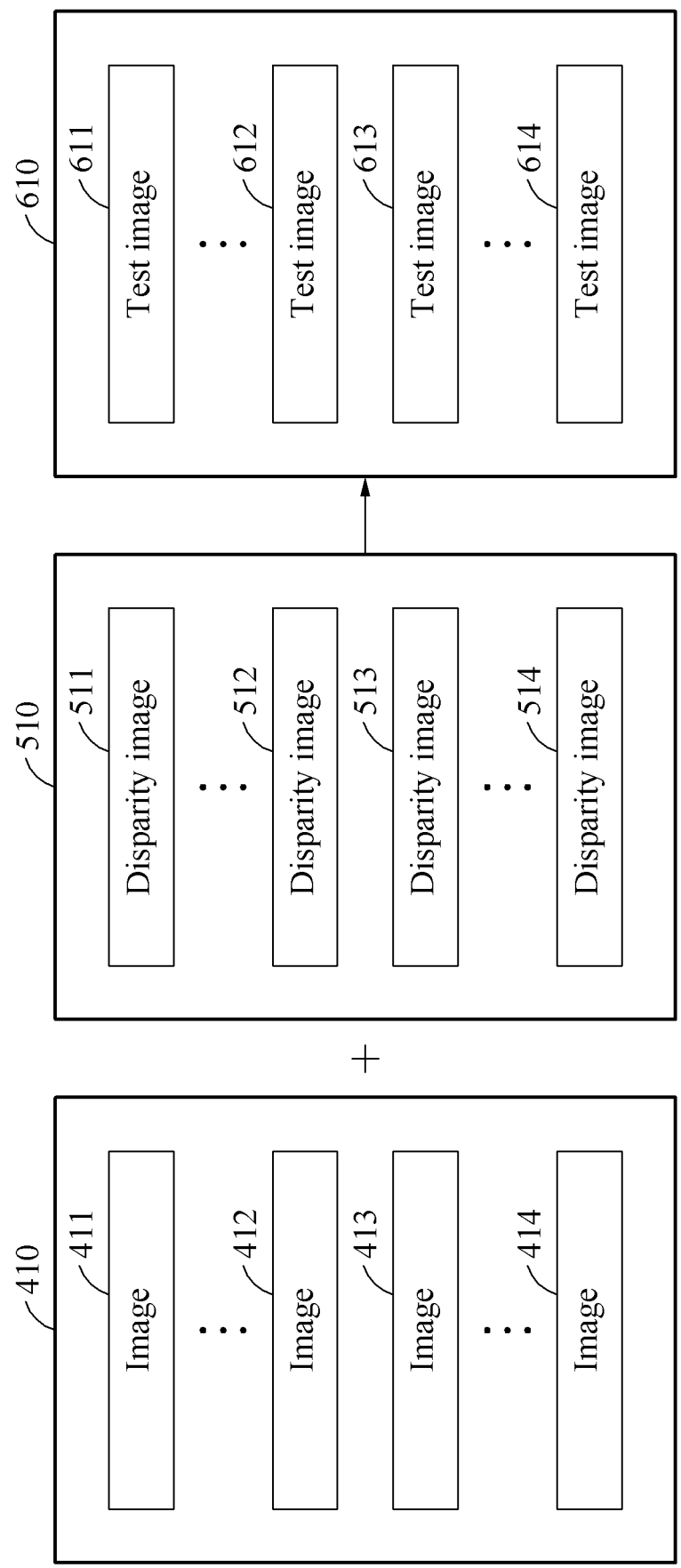
FIG. 6 illustrates an example of generating a test batch based on a first output batch and a second input batch.

FIG. 6 illustrates an example of generating a test batch based on a first output batch and a second input batch.

Referring to FIG. 6, a test batch 610 is generated to verify an updating state of the algorithm. For example, the test batch 610 is generated to verify the accuracy of the first output batch 510. The test batch 610 is generated based on the second input batch 420 and the first output batch 510. Respective viewpoints of test images 611 to 614 of the test batch 610 are the same as respective viewpoints of the images 411 to 414 of the first input batch 410.

Figure 7:
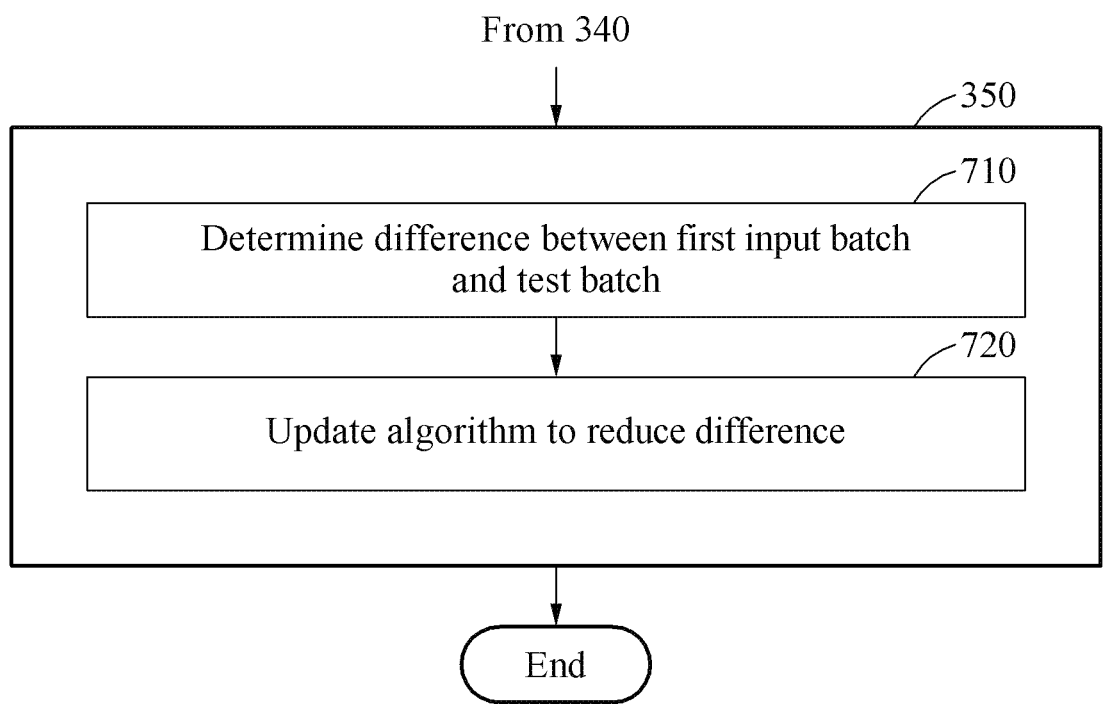
FIG. 7 illustrates an example of updating an algorithm to reduce a difference between a first input batch and a test batch.

FIG. 7 illustrates an example of updating an algorithm to reduce a difference between a first input batch and a test batch.

Referring to FIG. 7, operation 350 of FIG. 3 may include operations 710 and 720.

In operation 710, the apparatus 200 determines a difference between the first input batch and the test batch. The difference between the first input batch and the test batch may be a difference between a target input image of the first input batch and a target test image, corresponding to the target input image, of the test batch. For example, an average of respective differences between target input images and corresponding target test images may be determined to be the difference between the first input batch and the test batch.

In operation 720, the apparatus 200 updates the algorithm to reduce the determined difference between the first input batch and the test batch. For example, if the algorithm is a neural network, the algorithm may be updated through backpropagation.

Figure 8:
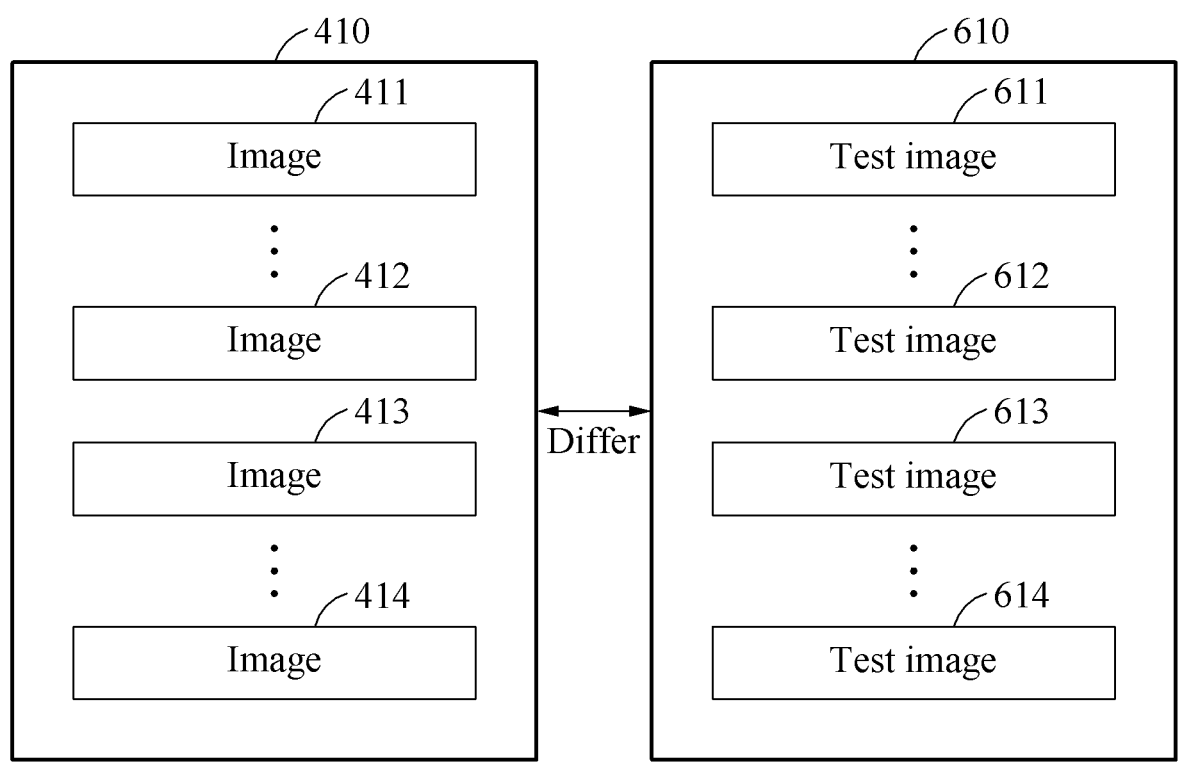
FIG. 8 illustrates an example of a first input batch and a test batch.

FIG. 8 illustrates an example of a first input batch and a test batch.

A difference between the first input batch 410 and the test batch 610 may be a difference between the image 411 of the first input batch 410 and the test image 611, corresponding to the image 411, of the test batch 610. For example, an average of differences with respect to the images 411 to 414 may be determined to be the difference between the first input batch 410 and the test batch 610.

Figure 9:
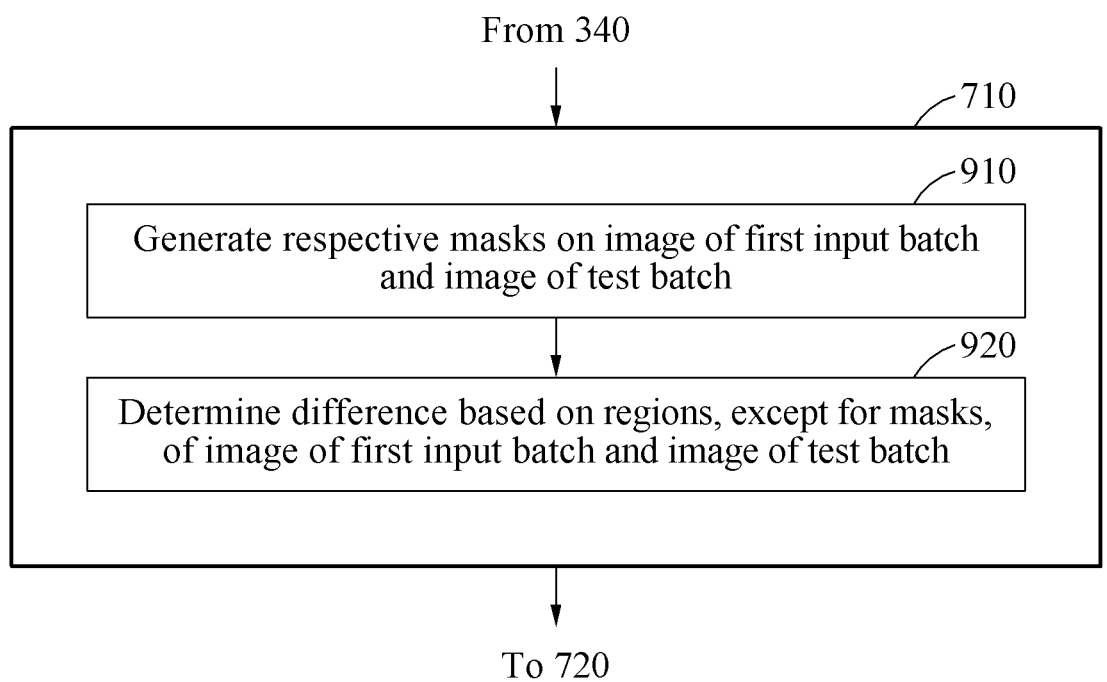
FIG. 9 illustrates an example of determining a difference between a first input batch and a test batch based on masks.

FIG. 9 illustrates an example of determining a difference between a first input batch and a test batch based on masks.

Referring to FIG. 9, operation 710 of FIG. 7 may include operations 910 and 920.

In operation 910, the apparatus 200 generates masks on an image of the first input batch and an image of the test batch.

For example, in an example in which a left image (the image of the test batch) is generated based on a right image (the image of the second input batch) and a disparity image, there is no information related to a region beyond a left boundary of the right image, and thus a left boundary region of the newly generated left image may be inaccurate. Therefore, a mask is set for the region to prevent inaccurate information from being determined to be the difference between the image of first input batch and the image of the test batch. Masks will be described in detail with reference to FIGS. 10 and 11.

In operation 920, the apparatus 200 determines the difference between the image of the first input batch and the image of the test batch, and thus the difference between the first input batch and the test batch, based on regions, except for the masks, of the image of the first input batch and the image of the test batch.

Figure 10:
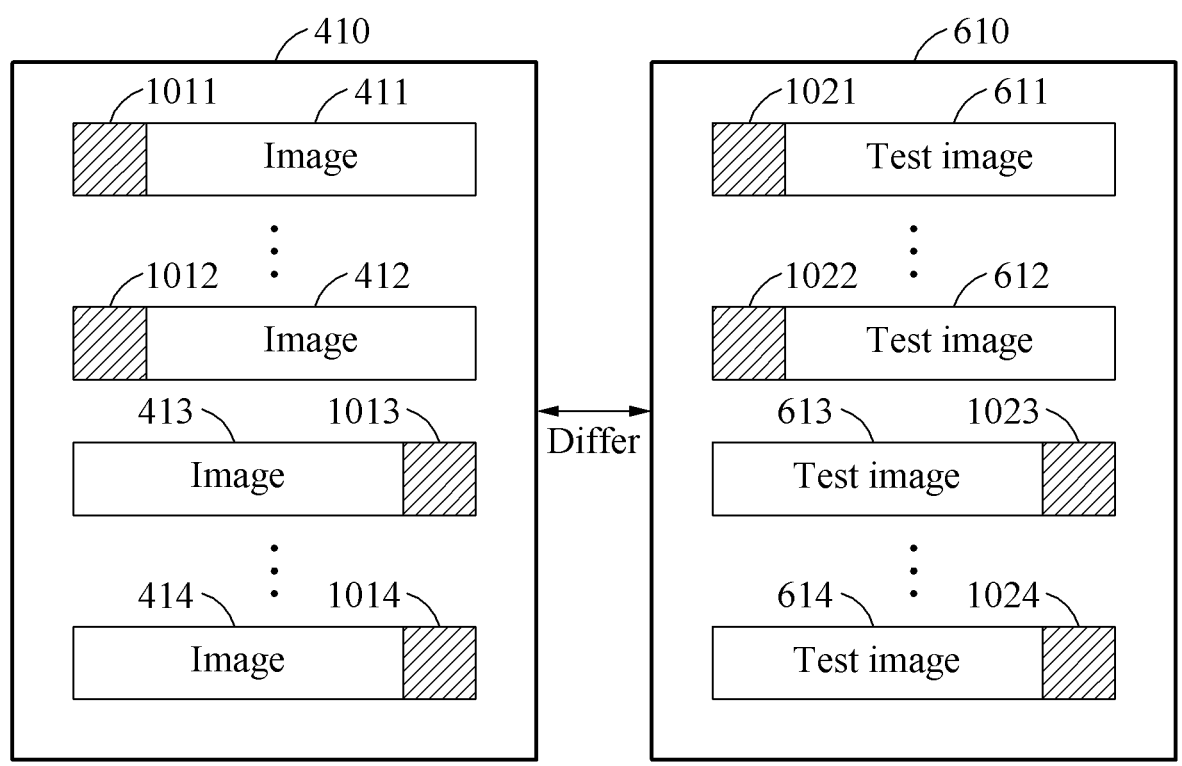
FIG. 10 illustrates an example of masks respectively generated on images of a first input batch and images of a test batch.

FIG. 10 illustrates an example of masks respectively generated on images of a first input batch and images of a test batch.

In an example in which the images 411 and 412 of the first input batch are left images, the test images 611 and 612 of the test batch 610 generated to correspond to the images 411 and 412 are also left images. Since the test images 611 and 612 are generated based on the images 421 and 422, which are right images, information related to left boundary regions 1021 and 1022 of the test images 611 and 612 are inaccurate. Therefore, masks are set for the left boundary regions 1021 and 1022.

If the images 413 and 414 of the first input batch are right images, the test images 613 and 614 of the test batch 610 generated to correspond to the images 413 and 414 are also right images. Since the test images 613 and 614 are generated based on the images 423 and 424 which are left images, information related to right boundary regions 1023 and 1024 of the test images 613 and 614 are inaccurate. Therefore, masks are set for the right boundary regions 1023 and 1024.

In another example, a mask is set based on an object in any one or any combination of the images 413 and 414 of the first input batch and the test images 613 and 614 of the test batch 610. In detail, at least one object is detected in the image 413 of the first input batch, and a mask is set based on object information such as a position of the object and the size of the object in the image 413. The mask is set in a region other than a region of interest including the object.

The size of a region for which a mask is set is determined based on a baseline of stereo cameras. For example, as the baseline increases, the size of the mask increases. The baseline and the masks will be described further below with reference to FIG. 11.

Figure 11:
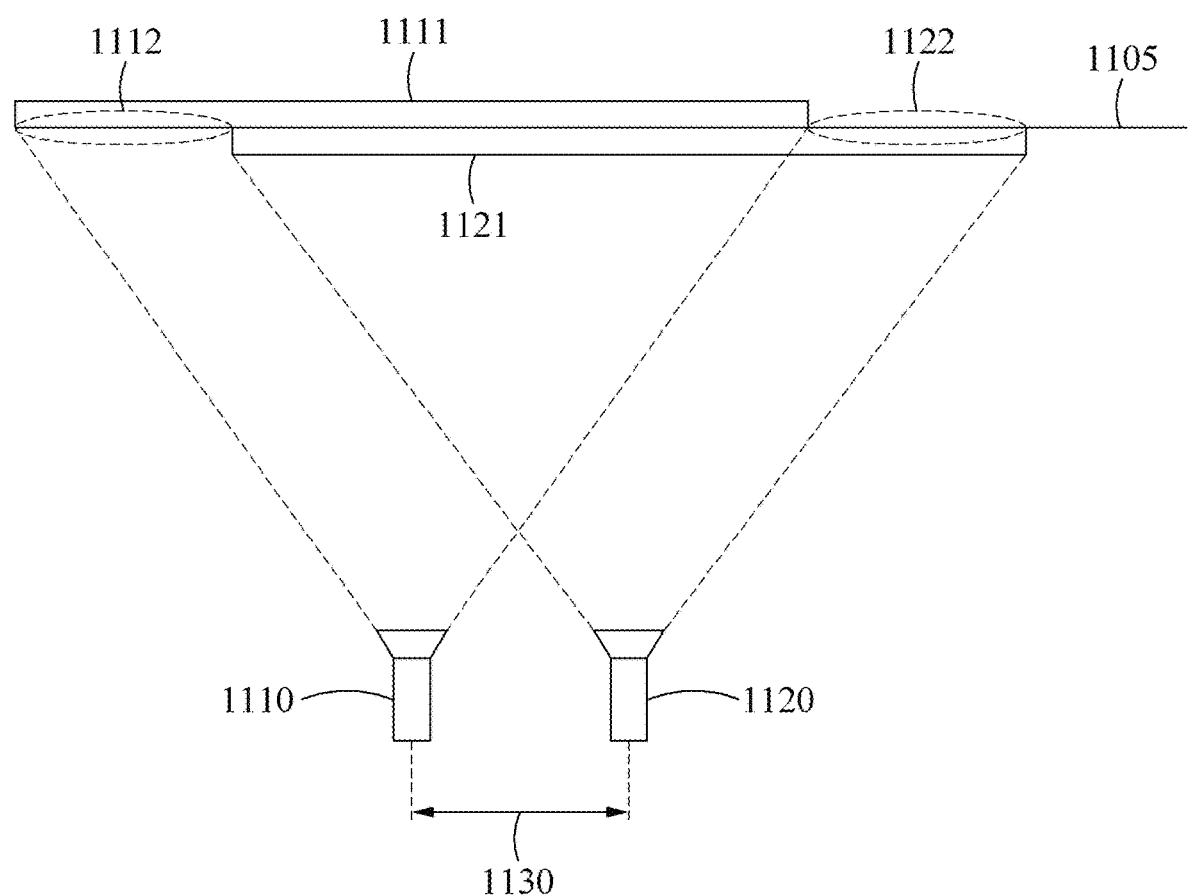
FIG. 11 illustrates an example of a baseline of cameras.

FIG. 11 illustrates an example of a baseline of cameras.

Referring to FIG. 11, stereo cameras 1110 and 1120 respectively generate images 1111 and 1121 by capturing a scene 1105. There are regions 1112 and 1122 not captured in the images 1111 and 1121 due to a baseline 1130 of the stereo cameras 1110 and 1120. Masks are set for such regions 1112 and 1122. For example, a mask is set for the left boundary region 1112 of the left camera 1110, and a mask is set for the right boundary region 1122 of the right camera 1120.

The method of generating a test batch to have a viewpoint the same as that of a first input batch and updating an algorithm based on the same has been described above with reference to FIGS. 3 through 11. Hereinafter, a method of generating a test batch to have a viewpoint different from that of a first input batch and updating an algorithm based on the same will be described below with reference to FIGS. 12 through 14.

Figure 12:
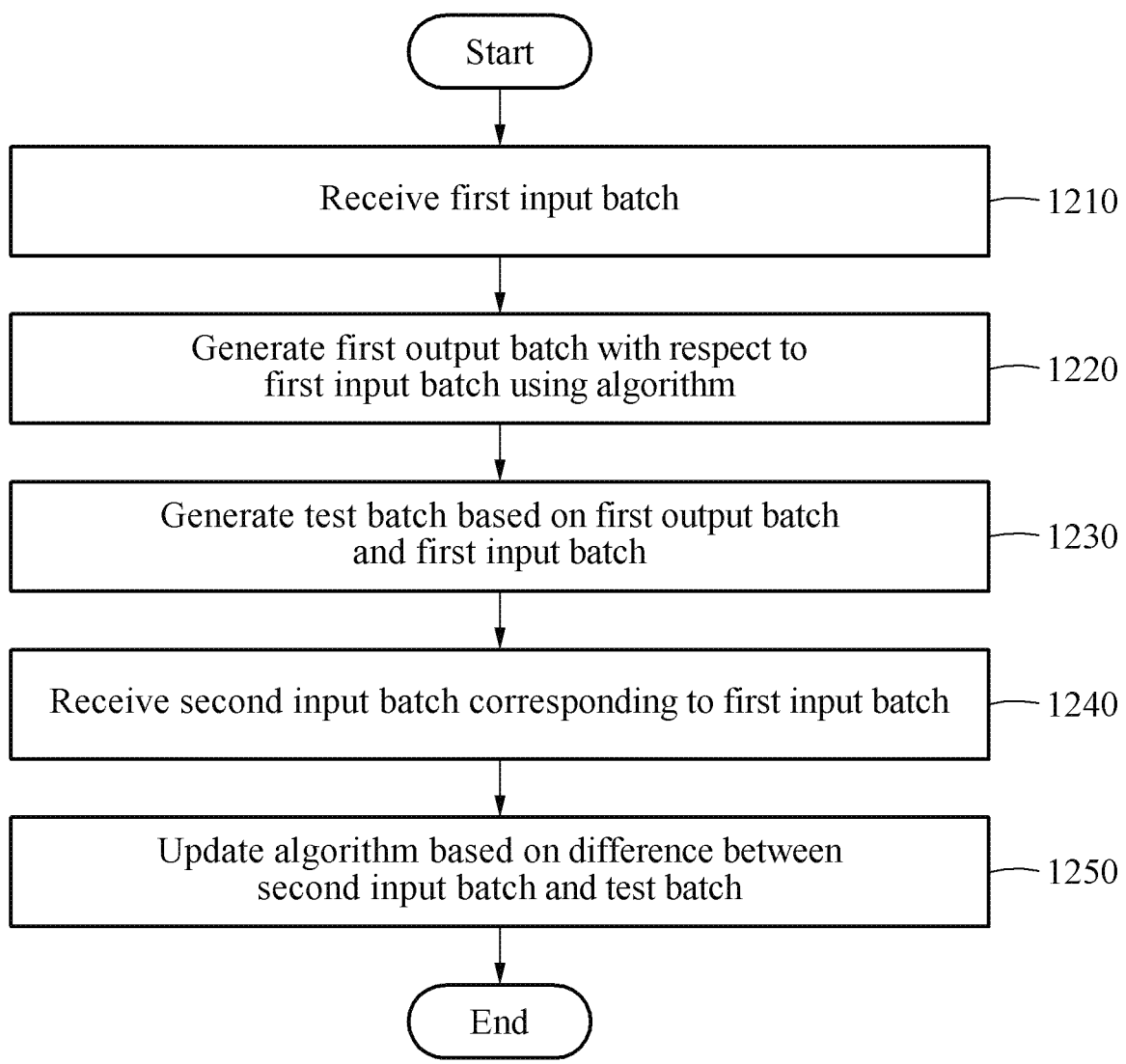
FIG. 12 illustrates an example of an algorithm updating method.

FIG. 12 illustrates an example of an algorithm updating method.

Operations 1210 to 1250 of FIG. 12 may be performed by the apparatus 200 of FIG. 2.

In operation 1210, the apparatus 200 receives a first input batch including one or more first images. The description of operation 1210 may correspond to the description of operation 310 of FIG. 3 and, thus, is omitted herein for conciseness.

In operation 1220, the apparatus 200 generates a first output batch with respect to the first input batch using an algorithm. The description of operation 1220 may correspond to the description of operation 320 of FIG. 3 and, thus, is omitted herein for conciseness.

In operation 1230, the apparatus 200 generates a test batch based on the first output batch and the first input batch. The description of operation 1230 may generally correspond to the description of operation 340 of FIG. 3 and, thus, is mostly omitted herein for conciseness. However, there lies a difference in operation 1230, in that the second input batch is used in operation 340 and the first input batch is used in operation 1230.

In operation 1240, the apparatus 200 receives a second input batch corresponding to the first input batch. The description of operation 1240 may correspond to the description of operation 330 of FIG. 3 and, thus, is omitted herein for conciseness.

Although FIG. 12 shows that operation 1230 is performed and then operation 1240 is subsequently performed, operations 1230 and 1240 may be performed independently and in parallel.

In operation 1250, the apparatus 200 updates the algorithm based on a difference between the second input batch and the test batch. For example, an image of the test batch may be generated such that a viewpoint of the image of the test batch is the same as a viewpoint of an image of the second input batch. Since the viewpoint of the image of the test batch is the same as the viewpoint of the image of the second input batch, the image of the test batch and the image of the second input batch are compared to each other. The image of the second input batch is regarded as a ground truth (GT), and a difference between the image of the second input batch and the image of the test batch is determined. The algorithm used to generate the first output batch may be updated based on the difference between the image of the second input batch and the image of the test batch. For example, the algorithm may be updated based on an average of respective differences between images of the second input batch and corresponding images of the test batch. An example of updating the algorithm will be described in detail with reference to FIGS. 13 through 14.

Figure 13:
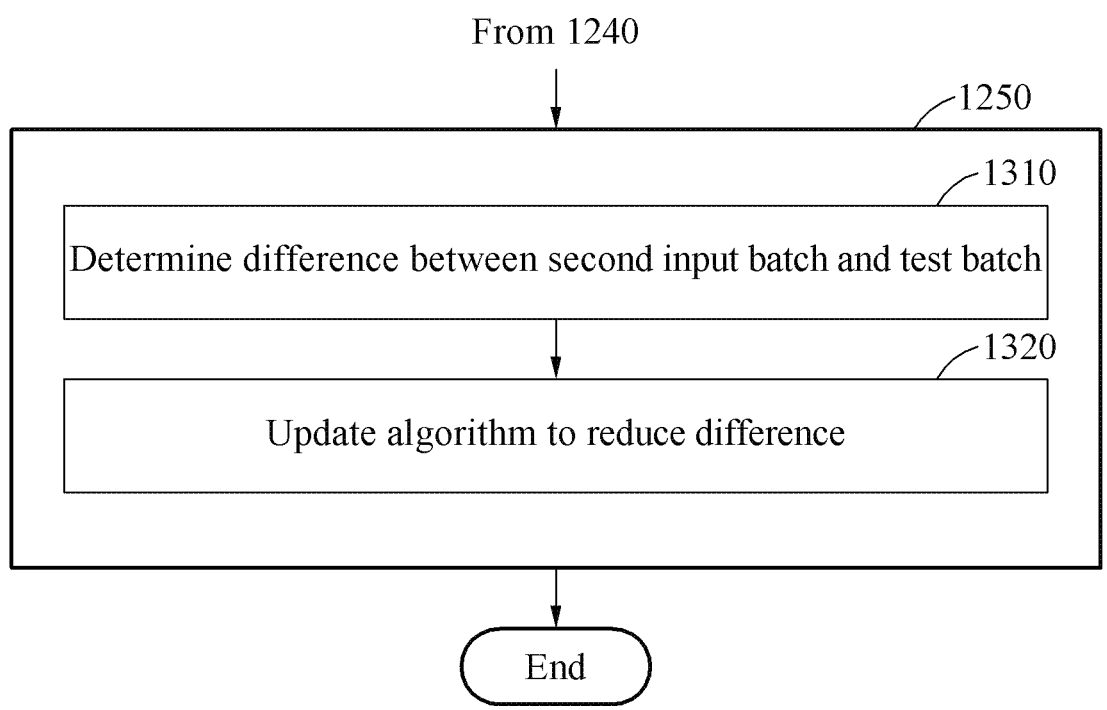
FIG. 13 illustrates an example of updating an algorithm to reduce a difference between a second input batch and a test batch.

FIG. 13 illustrates an example of updating an algorithm to reduce a difference between a second input batch and a test batch.

Referring to FIG. 13, operation 1250 of FIG. 12 includes operations 1310 and 1320.

In operation 1310, the apparatus 200 determines the difference between the second input batch and the test batch. The difference between the second input batch and the test batch may be a difference between a target input image of the second input batch and a target test image, corresponding to the target input image, of the test batch. For example, an average of respective differences between target input images and corresponding target test images may be determined to be the difference between the second input batch and the test batch.

In operation 1320, the apparatus 200 updates the algorithm to reduce the determined difference between the second input batch and the test batch. For example, if the algorithm is a neural network, the algorithm may be updated through backpropagation.

Figure 14:
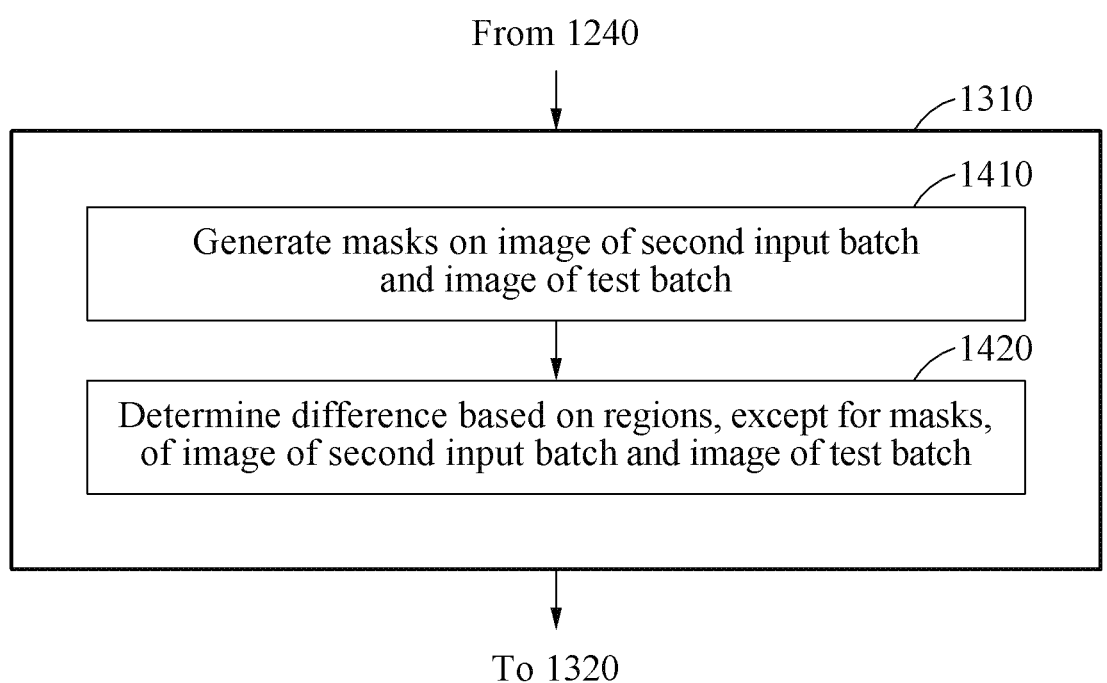
FIG. 14 illustrates an example of determining a difference between a second input batch and a test batch based on masks.

FIG. 14 illustrates an example of determining a difference between a second input batch and a test batch based on masks.

Referring to FIG. 14, operation 1310 of FIG. 13 may include operations 1410 and 1420.

In operation 1410, the apparatus 200 generates masks on an image of the second input batch and an image of the test batch.

For example, in an example in which a right image (the image of the test batch) is generated based on a left image (the image of the first input batch) and a disparity image, there may be no information related to a region beyond a right boundary of the left image, and thus a right boundary region of the newly generated left image may be inaccurate. Therefore, a mask is set for the right boundary region to prevent inaccurate information from being determined to be the difference between the image of the second input batch and the image of the test batch.

In operation 1420, the apparatus 200 determines the difference between the image of the second input batch and the image of the test batch, and thus the difference between the second input batch and the test batch, based on regions, except for the masks, of the image of the second input batch and the image of the test batch.

The navigation apparatus 200, the communicator 210, the processor 220, the memory 230, the processors, the memories, and other apparatuses, devices, units, modules, and other components in FIGS. 1 to 14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with algorithm updating, comprising:
   generating a first output batch with respect to a first input batch using an algorithm configured to generate a disparity image, the first input batch comprising one or more first input images, and the first output batch comprising one or more first output images;
   generating a test batch based on the first output batch and a second input batch corresponding to the first input batch, the test batch comprising one or more test images, and the second input batch comprising one or more second images having viewpoints that are different from viewpoints of the one or more first images; and
   updating the algorithm based on a difference between the first input batch and the test batch.

2. The method of claim 1, wherein the one or more first images comprise at least one left image captured by a left camera of stereo cameras and at least one right image captured by a right camera of the stereo cameras.

3. The method of claim 1, wherein the one or more first images do not have a label indicating a viewpoint.

4. The method of claim 1, wherein the one or more first images and the one or more second images are of respective stereo images.

5. The method of claim 1, wherein the algorithm is a neural network-based algorithm.

6. The method of claim 1, wherein the updating of the algorithm comprises:
   determining the difference between the first input batch and the test batch; and
   updating the algorithm to reduce the difference between the first input batch and the test batch.

7. The method of claim 6, wherein the determining of the difference between the first input batch and the test batch comprises:
   generating respective masks on a first image, among the one or more first images, and a test image, among the one or more test images; and
   determining the difference between the first input batch and the test batch based on regions, excluding the masks, of the first image and the test image.

8. The method of claim 7, wherein the generating of the respective masks comprises generating the respective masks based on a baseline of a camera.

9. The method of claim 7, wherein the generating of the respective masks comprises generating the respective masks based on either one or both of object information in the first image and object information in the test image.

10. A non-transitory computer-readable storage medium storing instructions that, when executed by a processor, cause the processor to perform the method of claim 1.

11. A method with algorithm updating, comprising:
   generating a first output batch with respect to a first input batch using an algorithm for generating a disparity image, the first input batch comprising one or more first input images, and the first output batch comprising one or more first output images, each image of the one or more first output images having a same viewpoint as a corresponding first input image of the one or more first input images;
   generating a test batch based on the first output batch and the first input batch, the test batch comprising one or more test images; and updating the algorithm based on a difference between the test batch and a second input batch corresponding to the first input batch, the second input batch comprising one or more second images having viewpoints that are different from viewpoints of the one or more first images.

12. The method of claim 11, wherein the updating of the algorithm comprises:
   determining the difference between the second input batch and the test batch; and
   updating the algorithm to reduce the difference between the second input batch and the test batch.

13. The method of claim 12, wherein the determining of the difference between the second input batch and the test batch comprises:
   generating respective masks on a second image, among the one or more second images, and a test image, among the one or more test images; and
   determining the difference between the second input batch and the test batch based on regions, excluding the masks, of the second image and the test image.

14. A non-transitory computer-readable storage medium storing instructions that, when executed by a processor, cause the processor to perform the method of claim 11.

15. An apparatus with algorithm updating, comprising:
   a processor configured to:
      generate a first output batch with respect to a first input batch using an algorithm configured to generate a disparity image, the first input batch comprising one or more first images, and the first output batch comprising one or more first output images;
      generate a test batch based on the first output batch and a second input batch corresponding to the first input batch, the test batch comprising one or more test images, and the second input batch comprising one or more second images having viewpoints that are different from viewpoints of the one or more first images; and
      update the algorithm based on a difference between the first input batch and the test batch.

16. The apparatus of claim 15, wherein the one or more first images comprise at least one left image captured by a left camera of stereo cameras and at least one right image captured by a right camera of the stereo cameras.

17. The apparatus of claim 15, wherein the updating of the algorithm comprises:
   determining the difference between the first input batch and the test batch; and
   updating the algorithm to reduce the difference between the first input batch and the test batch.

18. The apparatus of claim 17, wherein the determining of the difference between the first input batch and the test batch comprises:
   generating respective masks on a first image, among the one or more first images, and a test image, among the one or more test images; and
   determining the difference based on regions, excluding the masks, of the first image and the test image.

19. The apparatus of claim 18, wherein the generating of the respective masks comprises generating the respective masks based on a baseline of a camera.

20. The apparatus of claim 17, wherein the generating of the respective masks comprises generating the respective masks based on either one or both of object information in the first image and object information in the test image.

21. The apparatus of claim 15, further comprising a memory storing computer readable instructions, wherein the processor is configured to execute the instructions to configure the processor to perform the generation of the first output batch, the generation of the test batch, and the update of the disparity model.

22. An apparatus with algorithm updating, comprising:
   a processor configured to:
      generate a first output batch with respect to a first input batch using an algorithm for generating a disparity image, the first input batch comprising one or more first images, and the first output batch comprising one or more first output images;
      generate a test batch based on the first output batch and the first input batch, the test batch comprising one or more test images; and
      update the algorithm based on a difference between the test batch and a second input batch corresponding to the first input batch, the second input batch comprising one or more second images having viewpoints that are different from viewpoints of the one or more first images.

23. The apparatus of claim 22, further comprising stereo cameras including a left camera and a right camera, wherein the one or more first images comprise at least one left image generated by the left camera and at least one right image generated by the right camera.

24. The apparatus of claim 22, wherein the algorithm comprises a neural network-based algorithm, and
   wherein the updating of the algorithm comprises updating the algorithm through backpropagation.

25. The apparatus of claim 22, wherein the updating of the algorithm based on the difference between the second input batch and the test batch comprises updating the algorithm based on an average of respective differences between second images, among the one or more second images, and corresponding test images, among the two or more test images.

* * * * *